(12) United States Patent
Kim

(10) Patent No.: US 12,311,735 B2
(45) Date of Patent: May 27, 2025

(54) CONTROL METHOD FOR COOLING POWERTRAIN COMPONENT

(71) Applicants: Hyundai Motor Company, Seoul (KR); Kia Corporation, Seoul (KR)

(72) Inventor: Ki Hyun Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 266 days.

(21) Appl. No.: 18/309,079

(22) Filed: Apr. 28, 2023

(65) Prior Publication Data
US 2024/0066947 A1 Feb. 29, 2024

(30) Foreign Application Priority Data
Aug. 25, 2022 (KR) .................. 10-2022-0106649

(51) Int. Cl.
*B60H 1/00* (2006.01)
(52) U.S. Cl.
CPC ..... *B60H 1/00764* (2013.01); *B60H 1/00807* (2013.01); *B60H 1/00278* (2013.01)
(58) Field of Classification Search
CPC .......... B60H 2001/225; B60H 1/00764; B60H 1/00735; B60H 1/00771; B60H 1/00778; B60H 1/00828
See application file for complete search history.

(56) References Cited

U.S. PATENT DOCUMENTS

| 5,775,415 | A | * | 7/1998 | Yoshimi | B60H 1/00735 165/254 |
|---|---|---|---|---|---|
| 2001/0022222 | A1 | * | 9/2001 | Aoki | B60N 2/5657 165/203 |
| 2004/0050944 | A1 | * | 3/2004 | Matsunaga | B60H 1/143 237/12.3 B |
| 2012/0024517 | A1 | * | 2/2012 | Imanishi | B60H 1/32284 165/104.11 |
| 2012/0222438 | A1 | * | 9/2012 | Osaka | B60H 1/00764 62/126 |
| 2013/0068443 | A1 | * | 3/2013 | Yen | F25B 29/003 165/253 |
| 2013/0131919 | A1 | * | 5/2013 | Pan | B60H 1/3208 701/36 |
| 2015/0328961 | A1 | * | 11/2015 | Kim | B60H 1/3202 62/190 |
| 2016/0109163 | A1 | * | 4/2016 | Enomoto | B60H 1/32284 62/160 |
| 2017/0210196 | A1 | * | 7/2017 | Bidner | B60H 1/00492 |

(Continued)

*Primary Examiner* — Jianying C Atkisson
*Assistant Examiner* — Meraj A Shaikh
(74) *Attorney, Agent, or Firm* — Slater Matsil, LLP

(57) ABSTRACT

An embodiment is a control method for cooling a powertrain component, the method including in response to a destination being input to a navigation, determining estimated high-load driving timing of the powertrain component based on estimated driving information of a vehicle, and in response to a determination that a temperature difference between the actual temperature of the powertrain component and a reference temperature before the estimated high-load driving timing is lower than or equal to a precooling operating value, precooling the powertrain component until an actual temperature of the powertrain component reaches a target temperature by controlling an operation of each component of a powertrain cooling system.

17 Claims, 5 Drawing Sheets

(56) References Cited

U.S. PATENT DOCUMENTS

2018/0111504 A1* 4/2018 Matsusue ................ B60L 58/33
2018/0347493 A1* 12/2018 Tascillo .................. F02D 41/22
2021/0018016 A1* 1/2021 Kim .......................... F25B 6/02

* cited by examiner

CONTROL METHOD FOR COOLING POWERTRAIN COMPONENT

CROSS-REFERENCE TO RELATED APPLICATIONS

This application is based on and claims the benefit of priority to Korean Patent Application No. 10-2022-0106649, filed on Aug. 25, 2022, in the Korean Intellectual Property Office, the disclosure of which is incorporated herein in its entirety by reference.

TECHNICAL FIELD

The present disclosure relates to a control method for cooling a powertrain component.

BACKGROUND

With a growing interest in energy efficiency and environmental issues, there is a demand for development of eco-friendly vehicles that can replace internal combustion engine vehicles. Such eco-friendly vehicles are classified into electric vehicles which are driven by using fuel cells or electricity as a power source and hybrid vehicles which are driven by using an engine and a battery.

In order to ensure driving safety of an electric vehicle, it is necessary to keep powertrain components of an electric powertrain system and a battery (energy source) at appropriate temperatures. To this end, the electric vehicle includes a powertrain cooling system designed to keep the powertrain components of the powertrain system at their respective appropriate temperatures and a battery cooling system designed to keep the battery at its appropriate temperature. The powertrain cooling system and the battery cooling system may be thermally connected to a heating, ventilation, and air conditioning (HVAC) system for air conditioning in a passenger compartment so that the powertrain cooling system, the battery cooling system, and the HVAC system may constitute an integrated vehicle thermal management system. The powertrain cooling system may cool the powertrain components such as an electric motor, an inverter, an on-board charger (OBC), and a low DC-DC converter (LDC), thereby keeping the powertrain components at their respective appropriate temperatures. The battery cooling system may cool the battery, thereby keeping the battery at its appropriate temperature. The HVAC system may be configured to heat and cool the air in the passenger compartment for passenger comfort.

When the vehicle drives in high load conditions, the temperatures of the electric motor and the inverter among the powertrain components may excessively increase (that is, the heat generation amount is high). As a result, when the temperatures of the electric motor and the inverter increase to derating temperatures, the power output thereof may be lowered to a predetermined range to prevent damage to the electric motor and the inverter due to the operating load and/or thermal load thereof.

In addition, when a temperature of a coolant circulating through the powertrain cooling system increases as the vehicle drives in high load conditions and the temperatures of the electric motor and the inverter relatively increase, the operating loads of associated components of the HVAC system thermally connected to the powertrain cooling system and the operating loads of associated components of the battery cooling system thermally connected to the powertrain cooling system may relatively increase. Thus, power consumption of the powertrain cooling system, the battery cooling system, and the HVAC system may relatively increase.

When the vehicle drives in high load conditions, the power output of the powertrain components such as the electric motor and the inverter may be limited so that driving performance of the vehicle may be reduced. The power consumption of the powertrain cooling system for cooling the electric motor and the inverter and the power consumption of the battery cooling system and the HVAC system associated therewith may relatively increase so that electric efficiency of the vehicle may be relatively reduced.

The above information described in this background section is provided to assist in understanding the background of the inventive concept, and may include any technical concept which is not considered as the prior art that is already known to those skilled in the art.

SUMMARY

The present disclosure relates to a control method for cooling a powertrain component designed to precool the powertrain component before an electric vehicle drives in a high load condition, thereby avoiding power limit of the powertrain component, and improving electric efficiency of the electric vehicle.

The present disclosure has been made to solve the above-mentioned problems occurring in the prior art while advantages achieved by the prior art are maintained intact.

An aspect of the present disclosure provides a control method for cooling a powertrain component designed to precool the powertrain component before an electric vehicle drives in a high load condition, thereby preventing power limit of the powertrain component, and improving electric efficiency of the electric vehicle.

According to an aspect of the present disclosure, a control method for cooling a powertrain component may include: determining estimated high-load driving timing of the powertrain component based on estimated driving information of a vehicle when a destination is input to a navigation; and precooling the powertrain component until an actual temperature of the powertrain component reaches a target temperature by controlling an operation of each component of a powertrain cooling system when a temperature difference between the actual temperature of the powertrain component and a reference temperature before the estimated high-load driving timing is lower than or equal to a precooling operating value.

The control method may further include calculating an estimated temperature of the powertrain component for each time period of estimated driving time of the vehicle based on the estimated driving information of the vehicle. The precooling of the powertrain component may be performed at precooling start timing based on the estimated temperature of the powertrain component when a temperature difference between the actual temperature of the powertrain component, which is measured at determination timing before the estimated high-load driving timing, and the estimated temperature of the powertrain component, which is calculated at the determination timing before the estimated high-load driving timing, is within an error range.

The control method may further include recalculating the estimated temperature of the powertrain component for each time period of the estimated driving time after the determination timing when the temperature difference between the actual temperature of the powertrain component and the estimated temperature of the powertrain component is out of the error range.

The reference temperature may be a temperature at which the precooling of the powertrain component is required, and the reference temperature may be determined based on the estimated driving information and external environmental conditions.

The control method may further include determining whether a heating, ventilation, and air conditioning (HVAC) system operates in a cooling mode when the temperature difference between the actual temperature of the powertrain component and the reference temperature before the estimated high-load driving timing is lower than or equal to the precooling operating value.

The precooling of the powertrain component may be performed when the HVAC system does not operate in the cooling mode.

The precooling of the powertrain component may be performed when the HVAC system operates in the cooling mode and a temperature difference between an actual interior temperature of a passenger compartment and a cooling set temperature of the passenger compartment is less than a threshold value.

The precooling of the powertrain component may be continuously performed when the actual temperature of the powertrain component does not reach the target temperature after the precooling of the powertrain component, and the temperature difference between the actual interior temperature of the passenger compartment and the cooling set temperature of the passenger compartment is greater than or equal to the threshold value and is less than a tolerance value.

The control method may further include determining whether external environmental conditions are advantageous for the cooling of the powertrain component when the HVAC system operates in the cooling mode and a temperature difference between an actual interior temperature of a passenger compartment and a cooling set temperature of the passenger compartment is greater than or equal to a threshold value.

The precooling of the powertrain component may be performed when the external environmental conditions are advantageous for the cooling of the powertrain component.

The control method may further include: calculating first driving resistance of the vehicle based on the estimated driving information, and estimating a first required output of the powertrain component for each time period of estimated driving time of the vehicle based on the calculated first driving resistance; and calculating second driving resistance of the vehicle based on the first required output of the powertrain component and an actual output of the powertrain component obtained during an initial driving time, and estimating a second required output of the powertrain component for each time period of the estimated driving time based on the calculated second driving resistance.

The control method may further include: estimating a first temperature increase value of the powertrain component for each time period of estimated driving time of the vehicle based on the second required output; estimating the degree of influence of external environmental conditions on the temperature of the powertrain component using the external environmental conditions received from the navigation and a vehicle controller; and estimating a second temperature increase value of the powertrain component by correcting the first temperature increase value of the powertrain component based on the estimated degree of influence of the external environmental conditions.

The control method may further include calculating an estimated temperature of the powertrain component for each time period of the estimated driving time based on the second temperature increase value.

The control method may further include determining whether at least one of additional precooling start conditions is satisfied when it is determined whether the temperature difference between the actual temperature of the powertrain component and the estimated temperature of the powertrain component is within the error range. The additional precooling start conditions may include: a first additional precooling start condition in which power consumption is reduced by precooling; a second additional precooling start condition in which external environmental conditions are advantageous to assist in the cooling of the powertrain component; and a third additional precooling start condition in which derating of the powertrain component occurs.

When at least one of the first additional precooling start condition, the second additional precooling start condition, and the third additional precooling start condition is satisfied, the precooling of the powertrain component may be performed according to the satisfied one of the additional precooling start conditions.

The precooling start timing may be a point in time prior to the estimated high-load driving timing by a first time interval, and the first time interval may be a time interval required to cool the powertrain component to the target temperature.

The determination timing may be a point in time prior to the estimated high-load driving timing by a second time interval, and the second time interval may be twice the first time interval.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
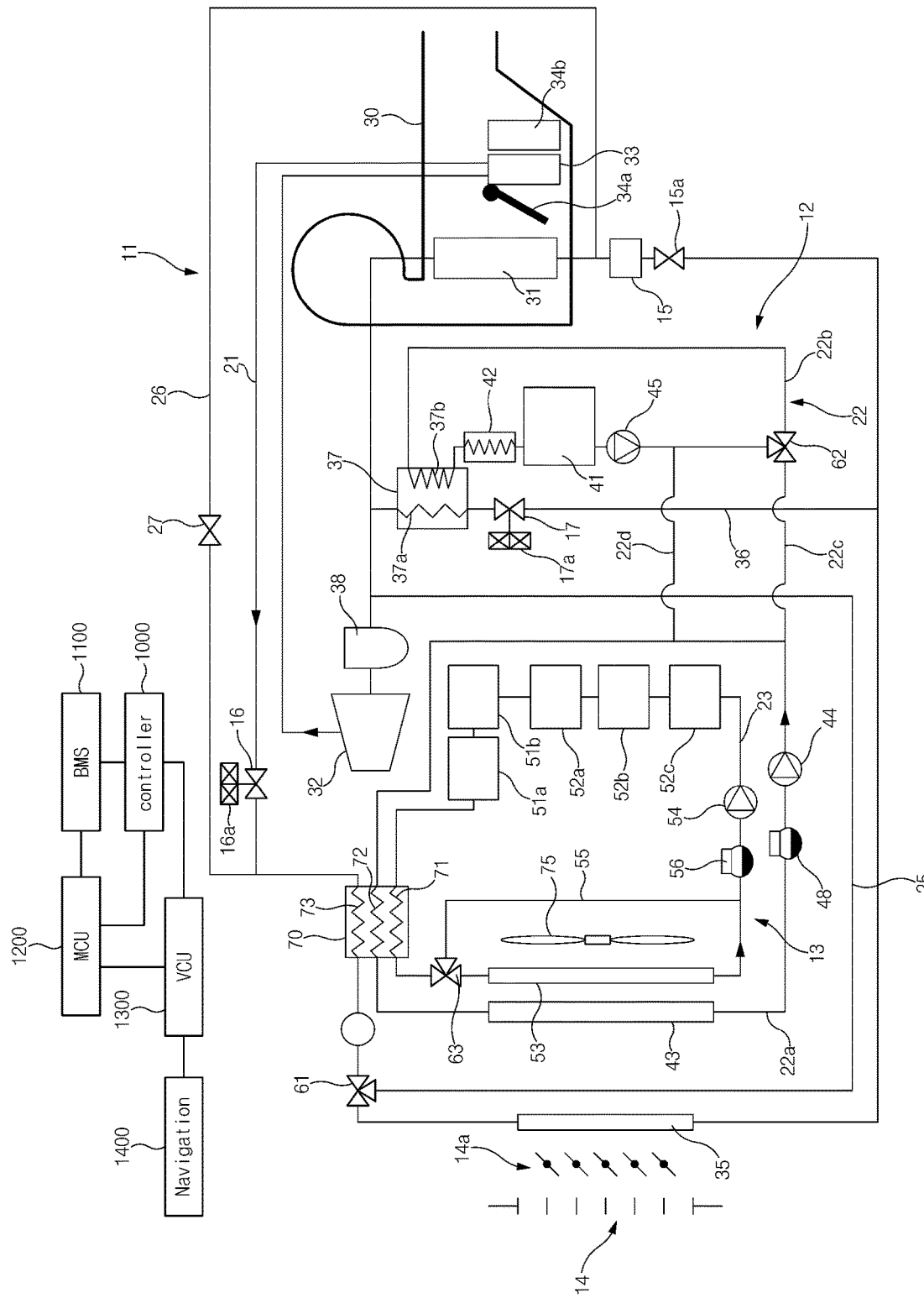
FIG. 1 illustrates a vehicle thermal management system including a powertrain cooling system according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a powertrain cooling system 13 according to an exemplary embodiment of the present disclosure may be thermally connected to a heating, ventilation, and air conditioning (HVAC) system 11 and a battery cooling system 12. Accordingly, the powertrain cooling system 13, the HVAC system 11, and the battery cooling system 12 may constitute a vehicle thermal management system.

(Powertrain Cooling System)

The powertrain cooling system 13 according to an exemplary embodiment of the present disclosure may be configured to cool a plurality of powertrain components using a powertrain-side coolant circulating in a powertrain coolant loop 23.

According to an exemplary embodiment, the plurality of powertrain components may include a first electric motor 51a driving front wheels, a second electric motor 51b driving rear wheels, a first inverter 52a controlling the speed and direction of the first electric motor 51a, a second inverter 52b controlling the speed and direction of the second electric motor 51b, and an integrated power conversion component 52c in which an on-board charger (OBC) and a low DC-DC converter (LDC) are integrated.

According to the exemplary embodiment illustrated in FIG. 1, the powertrain coolant loop 23 may be fluidly connected to a powertrain radiator 53, a reservoir tank 56, a powertrain-side pump 54, the plurality of powertrain components 51a, 51b, 52a, 52b, and 52c, and a first passage 71 of a water-cooled heat exchanger 70.

Each of the electric motors 51a and 51b may have a coolant passage provided inside or outside thereof, and the powertrain-side coolant may pass through the coolant passage. The powertrain coolant loop 23 may be fluidly connected to the coolant passage of each of the electric motors 51a and 51b. Each of the inverters 52a and 52b and the integrated power conversion component 52c may have a coolant passage provided inside or outside thereof, and the powertrain-side coolant may pass through the coolant passage. The powertrain coolant loop 23 may be fluidly connected to the coolant passage of each of the inverters 52a and 52b and the coolant passage of the integrated power conversion component 52c.

The powertrain radiator 53 may be adjacent to a front grille of the vehicle, and the powertrain radiator 53 may be cooled using ambient air forcibly blown by a cooling fan 75. An exterior heat exchanger 35, a battery radiator 43, and the powertrain radiator 53 may be disposed adjacent to each other on the front of the vehicle, and the cooling fan 75 may be disposed behind the exterior heat exchanger 35, the battery radiator 43, and the powertrain radiator 53.

The powertrain-side pump 54 may be configured to allow the powertrain-side coolant to circulate through the powertrain coolant loop 23. The powertrain-side pump 54 may be an electric pump driven by electric energy. The powertrain-side pump 54 may be disposed on the upstream or downstream side of the plurality of powertrain components 51a, 51b, 52a, 52b, and 52c. According to the exemplary embodiment illustrated in FIG. 1, the powertrain-side pump 54 may be disposed on the upstream side of the plurality of powertrain components 51a, 51b, 52a, 52b, and 52c.

The powertrain cooling system 13 may further include a powertrain bypass conduit 55 allowing the powertrain-side coolant to bypass the powertrain radiator 53. The powertrain bypass conduit 55 may directly connect an upstream point of the powertrain radiator 53 and a downstream point of the powertrain radiator 53 in the powertrain coolant loop 23 so that the powertrain-side coolant discharged from the first passage 71 of the water-cooled heat exchanger 70 may be directed into an inlet of the powertrain-side pump 54 through the powertrain bypass conduit 55, and accordingly the powertrain-side coolant may bypass the powertrain radiator 53.

An inlet of the powertrain bypass conduit 55 may be connected to the upstream point of the powertrain radiator 53 in the powertrain coolant loop 23. Specifically, the inlet of the powertrain bypass conduit 55 may be connected to a point between an inlet of the powertrain radiator 53 and the first passage 71 of the water-cooled heat exchanger 70 in the powertrain coolant loop 23.

An outlet of the powertrain bypass conduit 55 may be connected to the downstream point of the powertrain radiator 53 in the powertrain coolant loop 23. Specifically, the outlet of the powertrain bypass conduit 55 may be connected to a point between an outlet of the powertrain radiator 53 and the reservoir tank 56 in the powertrain coolant loop 23.

The powertrain cooling system 13 may include a three-way valve 63 disposed at the inlet of the powertrain bypass conduit 55. When the three-way valve 63 is switched to open the inlet of the powertrain bypass conduit 55, the powertrain-side coolant may pass through the powertrain bypass conduit 55 so that the powertrain-side coolant may bypass the powertrain radiator 53, and accordingly the powertrain-side coolant may sequentially pass through the first passage 71 of the water-cooled heat exchanger 70, the powertrain bypass conduit 55, the reservoir tank 56, and the powertrain components 52c, 52b, 52a, 51b, and 51a by the operation of the powertrain-side pump 54. When the three-way valve 63 is switched to close the inlet of the powertrain bypass conduit 55, the powertrain-side coolant may not be directed to the powertrain bypass conduit 55, and accordingly the powertrain-side coolant may sequentially pass through the first passage 71 of the water-cooled heat exchanger 70, the powertrain radiator 53, the reservoir tank 56, the powertrain-side pump 54, and the powertrain components 52c, 52b, 52a, 51b, and 51a.

Figure 2:
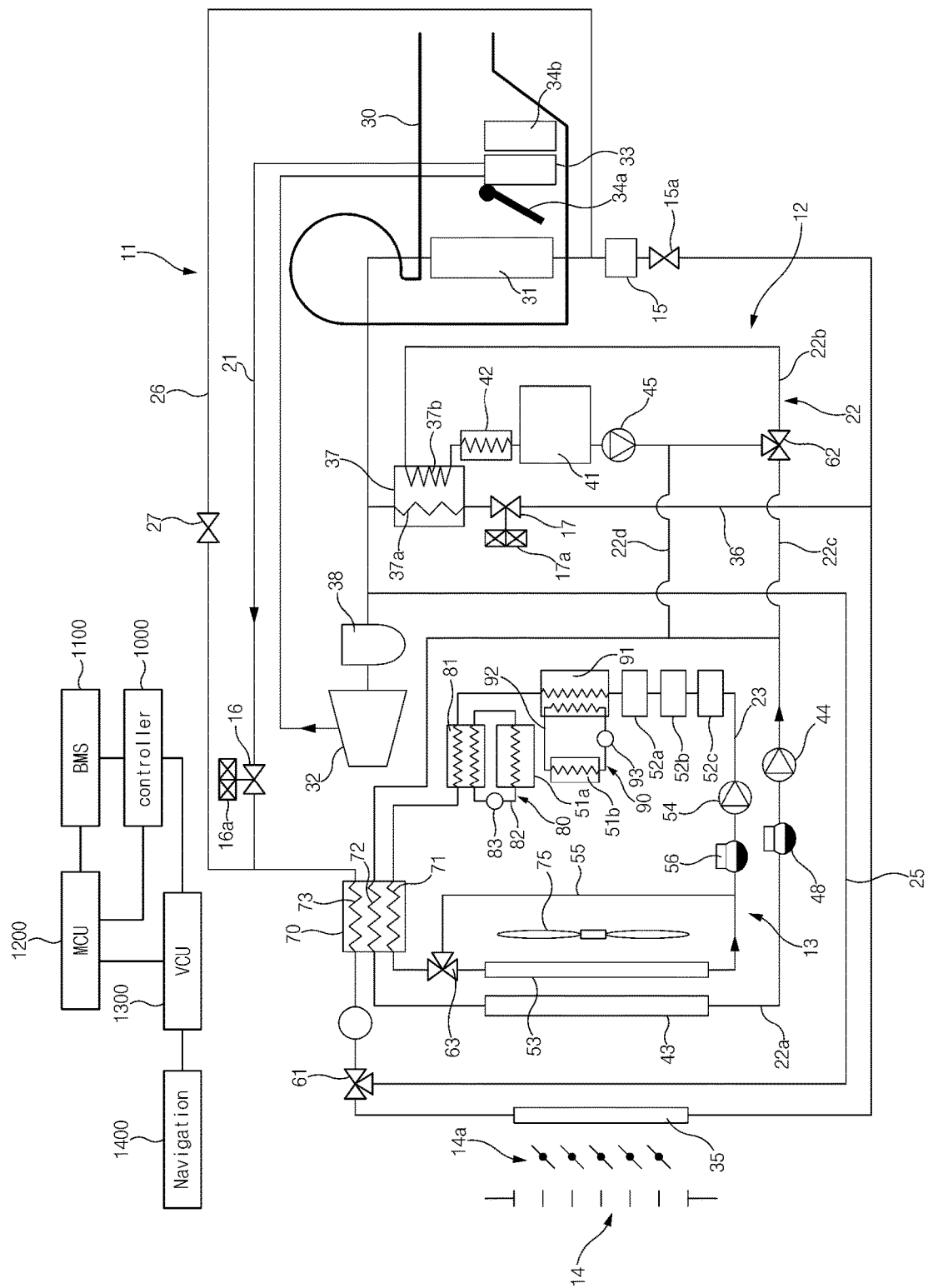
FIG. 2 illustrates a vehicle thermal management system including a powertrain cooling system according to an exemplary embodiment of the present disclosure.

According to an exemplary embodiment illustrated in FIG. 2, the first electric motor 51a and the second electric motor 51b may be an oil cooling structure which is cooled by oil.

Referring to FIG. 2, the first electric motor 51a may be cooled through heat exchange between the powertrain-side coolant and oil. The first electric motor 51a may be thermally connected to the coolant loop 23 through a first oil circuit 80, and the first electric motor 51a may have an oil passage through which the oil passes. The first oil circuit 80 may include a first oil cooler 81 connected to the coolant loop 23, a first oil loop 82 connecting the first oil cooler 81 and the first electric motor 51a, and a first oil pump 83 disposed in the first oil loop 82. The first oil cooler 81 may include a coolant passage fluidly connected to the coolant loop 23, and an oil passage fluidly connected to the first oil loop 82. The first oil loop 82 may connect the oil passage of the first oil cooler 81 and the oil passage of the first electric motor 51a. Accordingly, the first electric motor 51a may be cooled through heat exchange between the powertrain-side coolant circulating in the coolant loop 23 and the oil circulating in the first oil circuit 80.

Referring to FIG. 2, the second electric motor 51b may be cooled through heat exchange between the powertrain-side coolant and oil. The second electric motor 51b may be thermally connected to the coolant loop 23 through a second oil circuit 90, and the second electric motor 51b may have an oil passage through which the oil passes. The second oil circuit 90 may include a second oil cooler 91 connected to the coolant loop 23, a second oil loop 92 connecting the second oil cooler 91 and the second electric motor 51b, and a second oil pump 93 disposed in the second oil loop 92. The second oil cooler 91 may include a coolant passage fluidly connected to the coolant loop 23, and an oil passage fluidly connected to the second oil loop 92. The second oil loop 92 may connect the oil passage of the second oil cooler 91 and the oil passage of the second electric motor 51b. Accordingly, the second electric motor 51b may be cooled through heat exchange between the powertrain-side coolant circulating in the coolant loop 23 and the oil circulating in the second oil circuit 90.

Referring to FIG. 2, the powertrain coolant loop 23 may be fluidly connected to the first oil cooler 81, the second oil cooler 91, the first inverter 52a, the second inverter 52b, and the integrated power conversion component 52c. Each of the first inverter 52a, the second inverter 52b, and the integrated power conversion component 52c may have a coolant passage provided inside or outside thereof, and the powertrain-side coolant may pass through the coolant passage. The powertrain coolant loop 23 may be fluidly connected to the coolant passage of the first inverter 52a, the coolant passage of the second inverter 52b, and the coolant passage of the integrated power conversion component 52c.

According to an exemplary embodiment, the powertrain cooling system 13 may be controlled by a powertrain controller 1200. The powertrain controller 1200 may monitor temperatures of the powertrain components (the electric motors, the inverters, and the like) and a temperature of the powertrain-side coolant exchanging heat with the powertrain components, and control the operation of the powertrain-side pump 54, the operations of the oil pumps 83 and 93, the operation of the cooling fan 75, and the operation of the three-way valve 63 in order to cool the powertrain components when the temperatures of the powertrain components and the temperature of the powertrain-side coolant are higher than or equal to a threshold temperature.

According to another exemplary embodiment, the powertrain controller 1200 may indirectly control the powertrain cooling system 13 through a controller 1000 to be described below. That is, the powertrain controller 1200 may transmit a control signal to the controller 1000 so that the controller 1000 may control the powertrain cooling system 13.

According to another exemplary embodiment, the powertrain controller 1200 and the controller 1000 may be configured as an integrated controller.

(HVAC System)

The HVAC system 11 may be configured to provide air conditioning (cooling and heating) in a passenger compartment. In particular, the HVAC system 11 may be configured to heat or cool the air in the passenger compartment of the vehicle using a refrigerant circulating in a refrigerant loop 21. The HVAC system 11 may include the refrigerant loop 21 and an HVAC case 30. The refrigerant loop 21 may be fluidly connected to an evaporator 31, a compressor 32, an interior condenser 33, a heating-side expansion valve 16, the water-cooled heat exchanger 70, the exterior heat exchanger 35, and a cooling-side expansion valve 15. In FIG. 1, the refrigerant may sequentially pass through the compressor 32, the interior condenser 33, the heating-side expansion valve 16, the water-cooled heat exchanger 70, the exterior heat exchanger 35, the cooling-side expansion valve 15, and the evaporator 31 through the refrigerant loop 21. The refrigerant loop 21 may be configured to provide various refrigerant circulation paths or refrigerant flow paths based on various operating modes of the vehicle thermal management system.

The compressor 32 may compress the refrigerant and allow the refrigerant to circulate. In particular, the compressor 32 may compress the refrigerant received from the evaporator 31 and/or a battery chiller 37. The compressor 32 may include a compressor motor and a compression section operated by the compressor motor. The refrigerant loop 21 may be fluidly connected to the compression section of the compressor 32.

The HVAC system 11 may include an accumulator 38 located on the upstream side of the compressor 32. The accumulator 38 may be located between the evaporator 31 and the compressor 32, and the accumulator 38 may separate a liquid refrigerant from the refrigerant which is received from the evaporator 31, thereby preventing the liquid refrigerant from being directed into the compressor 32.

The interior condenser 33 may be configured to condense the refrigerant received from the compressor 32, and accordingly the air passing through the interior condenser 33 may be heated by the interior condenser 33. As the air heated by the interior condenser 33 is directed into the passenger compartment, the passenger compartment may be heated.

The exterior heat exchanger 35 may be adjacent to the front grille of the vehicle. Since the exterior heat exchanger 35 is exposed to the outside, heat may be transferred between the exterior heat exchanger 35 and the ambient air. During a cooling operation of the HVAC system 11, the exterior heat exchanger 35 may be configured to condense the refrigerant received from the interior condenser 33. That is, the exterior heat exchanger 35 may serve as an exterior condenser that condenses the refrigerant by transferring heat to the ambient air during the cooling operation of the HVAC system 11. During a heating operation of the HVAC system 11, the exterior heat exchanger 35 may be configured to evaporate the refrigerant received from the water-cooled heat exchanger 70. That is, the exterior heat exchanger 35 may serve as an exterior evaporator that evaporates the refrigerant by absorbing heat from the ambient air during the heating operation of the HVAC system 11. In particular, the exterior heat exchanger 35 may exchange heat with the ambient air forcibly blown by the cooling fan 75 so that a heat transfer rate between the exterior heat exchanger 35 and the ambient air may be further increased.

The powertrain cooling system 13 may be thermally connected to the HVAC system 11 and the battery cooling system 12 through the water-cooled heat exchanger 70. The water-cooled heat exchanger 70 may be configured to transfer heat between the refrigerant loop 21 of the HVAC system 11, a battery coolant loop 22 of the battery cooling system 12, and the powertrain coolant loop 23 of the powertrain cooling system 13. Specifically, the water-cooled heat exchanger 70 may be disposed between the interior condenser 33 and the exterior heat exchanger 35 in the refrigerant loop 21. The water-cooled heat exchanger 70 may include the first passage 71 fluidly connected to the powertrain coolant loop 23, a second passage 72 fluidly connected to the battery coolant loop 22, and a third passage 73 fluidly connected to the refrigerant loop 21.

During the heating operation of the HVAC system 11, the water-cooled heat exchanger 70 may be configured to evaporate the refrigerant which is received from the interior condenser 33 using heat which is received from the powertrain cooling system 13. That is, during the heating operation of the HVAC system 11, the water-cooled heat exchanger 70 may serve as an evaporator that evaporates the refrigerant by recovering waste heat from the powertrain components 51a, 51b, 52a, 52b, and 52c of the powertrain cooling system 13.

During the cooling operation of the HVAC system 11, the water-cooled heat exchanger 70 may be configured to condense the refrigerant which is received from the interior condenser 33. The water-cooled heat exchanger 70 may serve as a condenser that condenses the refrigerant by cooling and condensing the refrigerant using a battery-side coolant circulating in the battery coolant loop 22 of the battery cooling system 12 and the powertrain-side coolant circulating in the powertrain coolant loop 23 of the powertrain cooling system 13.

The heating-side expansion valve 16 may be located on the upstream side of the water-cooled heat exchanger 70 in the refrigerant loop 21. Specifically, the heating-side expansion valve 16 may be disposed between the interior condenser 33 and the water-cooled heat exchanger 70. During the heating operation of the HVAC system 11, the heating-side expansion valve 16 may adjust the flow of the refrigerant and/or the flow rate of the refrigerant into the exterior heat exchanger 35 and/or the water-cooled heat exchanger 70. The heating-side expansion valve 16 may be configured to expand the refrigerant received from the interior condenser 33 during the heating operation of the HVAC system 11.

According to an exemplary embodiment, the heating-side expansion valve 16 may be an electronic expansion valve (EXV) having a drive motor 16a. The drive motor 16a may have a shaft which is movable to open or close an orifice defined in a valve body of the heating-side expansion valve 16, and the position of the shaft may be varied depending on the rotation direction, rotation degree, and the like of the drive motor 16a, and thus the opening degree of the orifice of the heating-side expansion valve 16 may be varied. The controller 1000 may control the operation of the drive motor 16a. The opening degree of the heating-side expansion valve 16 may be adjusted by the controller 1000. As the opening degree of the heating-side expansion valve 16 is varied, the flow rate of the refrigerant into the exterior heat exchanger 35 and/or the water-cooled heat exchanger 70 may be varied. The operation of the drive motor 16a of the heating-side expansion valve 16 may be controlled by the controller 1000 during the heating operation of the HVAC system 11. The heating-side expansion valve 16 may be a full open type EXV. When the HVAC system 11 operates in a cooling mode, the heating-side expansion valve 16 may be fully opened. As the heating-side expansion valve 16 is fully opened to 100%, the refrigerant may pass through the heating-side expansion valve 16 without expansion of the refrigerant.

The cooling-side expansion valve 15 may be disposed between the exterior heat exchanger 35 and the evaporator 31 in the refrigerant loop 21. The cooling-side expansion valve 15 may be located on the upstream side of the evaporator 31, thereby adjusting the flow of the refrigerant and/or the flow rate of the refrigerant into the evaporator 31. During the cooling operation of the HVAC system 11, the cooling-side expansion valve 15 may be configured to expand the refrigerant received from the exterior heat exchanger 35.

According to an exemplary embodiment, the cooling-side expansion valve 15 may be a thermal expansion valve (TXV) which senses the temperature and/or pressure of the refrigerant and adjusts the opening degree of the cooling-side expansion valve 15. Specifically, the cooling-side expansion valve 15 may be a TXV having a shut-off valve 15a selectively blocking the flow of the refrigerant toward an internal passage of the cooling-side expansion valve 15, and the shut-off valve 15a may be a solenoid valve. The shut-off valve 15a may be opened or closed by the controller 1000, thereby unblocking or blocking the flow of the refrigerant into the cooling-side expansion valve 15. When the shut-off valve 15a is opened, the refrigerant may be allowed to flow into the cooling-side expansion valve 15, and when the shut-off valve 15a is closed, the refrigerant may be blocked from flowing into the cooling-side expansion valve 15. According to an exemplary embodiment, the shut-off valve 15a may be mounted in the inside of a valve body of the cooling-side expansion valve 15, thereby opening or closing the internal passage of the cooling-side expansion valve 15. According to another exemplary embodiment, the shut-off valve 15a may be located on the upstream side of the cooling-side expansion valve 15, thereby selectively opening or closing an inlet of the cooling-side expansion valve 15.

When the shut-off valve 15a is closed, the flow of the refrigerant into the cooling-side expansion valve 15 may be blocked, and accordingly the refrigerant may only be directed into the battery chiller 37 without flowing into the cooling-side expansion valve 15 and the evaporator 31. That is, when the shut-off valve 15a of the cooling-side expansion valve 15 is closed, the cooling operation of the HVAC system 11 may not be performed, and only the battery chiller 37 may be cooled or the heating operation of the HVAC system 11 may be performed. When the shut-off valve 15a is opened, the refrigerant may be directed into the cooling-side expansion valve 15 and the evaporator 31. That is, when the shut-off valve 15a of the cooling-side expansion valve 15 is opened, the cooling operation of the HVAC system 11 may be performed.

The evaporator 31 may be disposed on the downstream side of the cooling-side expansion valve 15, and may receive the refrigerant expanded by the cooling-side expansion valve 15. The evaporator 31 may be configured to cool the air using the refrigerant received from the cooling-side expansion valve 15. That is, the refrigerant expanded by the cooling-side expansion valve 15 may absorb heat from the air and evaporate in the evaporator 31. During the cooling operation of the HVAC system 11, the evaporator 31 may cool the air using the refrigerant cooled by the exterior heat exchanger 35 and expanded by the cooling-side expansion valve 15, and the air cooled by the evaporator 31 may be directed into the passenger compartment.

The HVAC case 30 may have an inlet and an outlet. The HVAC case 30 may be configured to allow the air to be directed into the passenger compartment of the vehicle. The evaporator 31 and the interior condenser 33 may be located in the HVAC case 30. An air mixing door 34a may be disposed between the evaporator 31 and the interior condenser 33, and a PTC (positive temperature coefficient) heater 34b may be disposed on the downstream side of the interior condenser 33.

The HVAC system 11 may further include a bypass conduit 36 branching off from the refrigerant loop 21. The bypass conduit 36 may branch off from an upstream point of the cooling-side expansion valve 15 and be connected to the compressor 32 in the refrigerant loop 21. The battery chiller 37 may be fluidly connected to the bypass conduit 36, and the battery chiller 37 may be configured to transfer heat between the bypass conduit 36 and the battery coolant loop 22. That is, the battery chiller 37 may be configured to transfer heat between the refrigerant circulating in the HVAC system 11 and the battery-side coolant circulating in the battery cooling system 12.

Specifically, the battery chiller 37 may include a first passage 37a fluidly connected to the bypass conduit 36, and a second passage 37b fluidly connected to the battery coolant loop 22. The first passage 37a and the second passage 37b may be adjacent to or contact each other within the battery chiller 37, and the first passage 37a may be fluidly separated from the second passage 37b. Accordingly, the battery chiller 37 may be configured to transfer heat between the battery-side coolant passing through the second passage 37b and the refrigerant passing through the first passage 37a. The refrigerant may absorb heat from the battery-side coolant, thereby being evaporated and superheated, and the battery-side coolant may release heat to the refrigerant, thereby being cooled.

The bypass conduit 36 may be fluidly connected to the accumulator 38, and the refrigerant passing through the bypass conduit 36 may be received in the accumulator 38.

A chiller-side expansion valve 17 may be disposed on the upstream side of the battery chiller 37 in the bypass conduit 36. The chiller-side expansion valve 17 may be configured to adjust the flow of the refrigerant and/or the flow rate of the refrigerant into the battery chiller 37, and the chiller-side expansion valve 17 may be configured to expand the refrigerant received from the exterior heat exchanger 35.

According to an exemplary embodiment, the chiller-side expansion valve 17 may be an EXV having a drive motor 17a. The drive motor 17a may have a shaft which is movable to open or close an orifice defined in a valve body of the chiller-side expansion valve 17, and the position of the shaft may be varied depending on the rotation direction, rotation degree, and the like of the drive motor 17a, and thus the opening degree of the orifice of the chiller-side expansion valve 17 may be varied. The controller 1000 may control the operation of the drive motor 17a so that the opening degree of the chiller-side expansion valve 17 may be varied. That is, the opening degree of the chiller-side expansion valve 17 may be adjusted by the controller 1000. As the opening degree of the chiller-side expansion valve 17 is varied, the flow rate of the refrigerant into the first passage 37a of the battery chiller 37 may be varied. The operation of the drive motor 17a of the chiller-side expansion valve 17 may be controlled by the controller 1000 during a cooling operation of a battery 41. When the cooling of the battery 41 is not required, the chiller-side expansion valve 17 may be fully closed. The chiller-side expansion valve 17 may be a full open type EXV.

As the opening degree of the chiller-side expansion valve 17 is varied, the flow rate of the refrigerant into the battery chiller 37 may be varied. For example, when the opening degree of the chiller-side expansion valve 17 is greater than a reference opening degree, the flow rate of the refrigerant into the battery chiller 37 may be relatively increased above a reference flow rate, and when the opening degree of the chiller-side expansion valve 17 is less than the reference opening degree, the flow rate of the refrigerant into the battery chiller 37 may be similar to the reference flow rate or be relatively lowered below the reference flow rate. Here, the reference opening degree refers to an opening degree of the chiller-side expansion valve 17 required to maintain a target evaporator temperature, and the reference flow rate refers to a flow rate of the refrigerant which is allowed to flow into the battery chiller 37 when the chiller-side expansion valve 17 is opened to the reference opening degree. When the chiller-side expansion valve 17 is opened to the reference opening degree, the refrigerant may be directed into the battery chiller 37 at the corresponding reference flow rate.

As the opening degree of the chiller-side expansion valve 17 is adjusted by the controller 1000, the flow rate of the refrigerant into the battery chiller 37 may be varied so that the flow rate of the refrigerant into the evaporator 31 may be varied. Accordingly, as the opening degree of the chiller-side expansion valve 17 is adjusted, the refrigerant may be distributed to the evaporator 31 and the battery chiller 37 at a predetermined ratio, and thus the cooling of the HVAC system 11 and the cooling of the battery chiller 37 may be performed simultaneously or selectively.

The HVAC system 11 may include a first refrigerant bypass conduit 25 connecting an upstream point of the exterior heat exchanger 35 and an upstream point of the compressor 32. An inlet of the first refrigerant bypass conduit 25 may be connected to the upstream point of the exterior heat exchanger 35, and an outlet of the first refrigerant bypass conduit 25 may be connected to the upstream point of the compressor 32. Specifically, the inlet of the first refrigerant bypass conduit 25 may be connected to a point between the water-cooled heat exchanger 70 and the exterior heat exchanger 35, and the outlet of the first refrigerant bypass conduit 25 may be connected to a point between the battery chiller 37 and the compressor 32. A three-way valve 61 may be disposed at a junction between the inlet of the first refrigerant bypass conduit 25 and the refrigerant loop 21. Accordingly, the three-way valve 61 may be disposed between the exterior heat exchanger 35 and the water-cooled heat exchanger 70 in the refrigerant loop 21. When the three-way valve 61 is switched to open the inlet of the first refrigerant bypass conduit 25, the refrigerant passing through the third passage 73 of the water-cooled heat exchanger 70 may be directed into the compressor 32 through the first refrigerant bypass conduit 25 and the accumulator 38. That is, when the inlet of the first refrigerant bypass conduit 25 is opened by the switching of the three-way valve 61, the refrigerant may bypass the exterior heat exchanger 35. When the three-way valve 61 is switched to close the inlet of the first refrigerant bypass conduit 25, the refrigerant discharged from the third passage 73 of the water-cooled heat exchanger 70 may be directed into the exterior heat exchanger 35 without passing through the first refrigerant bypass conduit 25. That is, when the inlet of the first refrigerant bypass conduit 25 is closed by the switching of the three-way valve 61, the refrigerant may pass through the exterior heat exchanger 35.

The controller 1000 may be configured to control respective operations of the shut-off valve 15a of the cooling-side expansion valve 15, the heating-side expansion valve 16, the chiller-side expansion valve 17, the compressor 32, and the like, and thus the overall operation of the HVAC system 11 may be controlled by the controller 1000. According to an exemplary embodiment, the controller 1000 may be a full automatic temperature control system (FATC).

The controller 1000 may be configured to control the overall operation of the vehicle thermal management system including the battery cooling system 12 and the powertrain cooling system 13 as well as the HVAC system 11.

When the HVAC system 11 operates in a cooling mode, the shut-off valve 15a of the cooling-side expansion valve 15 may be opened. The refrigerant may sequentially pass through the compressor 32, the interior condenser 33, the heating-side expansion valve 16, the third passage 73 of the water-cooled heat exchanger 70, the exterior heat exchanger 35, the cooling-side expansion valve 15, and the evaporator 31.

When the HVAC system 11 operates in a heating mode, the shut-off valve 15a of the cooling-side expansion valve 15 may be closed. The refrigerant may sequentially pass through the compressor 32, the interior condenser 33, the heating-side expansion valve 16, the third passage 73 of the water-cooled heat exchanger 70, the exterior heat exchanger 35, the chiller-side expansion valve 17, the first passage 37a of the battery chiller 37, and the compressor 32. Meanwhile, during the heating operation of the HVAC system 11, when the shut-off valve 15a of the cooling-side expansion valve 15 is closed and the inlet of the first refrigerant bypass conduit 25 is opened by the switching of the three-way valve 61, the refrigerant may sequentially pass through the compressor 32, the interior condenser 33, the heating-side expansion valve 16, the third passage 73 of the water-cooled heat exchanger 70, and the compressor 32.

The HVAC system 11 may further include a second refrigerant bypass conduit 26 branching off from the refrigerant loop 21. The second refrigerant bypass conduit 26 may branch off from a point between the heating-side expansion valve 16 and the third passage 73 of the water-cooled heat exchanger 70 in the refrigerant loop 21, and the second refrigerant bypass conduit 26 may extend to an upstream point of the evaporator 31. A shut-off valve 27 may be disposed to open and close the second refrigerant bypass conduit 26. When dehumidification in the passenger compartment is required during the heating operation of the HVAC system 11, the shut-off valve 27 may be opened so that a portion of the refrigerant from the heating-side expansion valve 16 may be directed into the evaporator 31 through the second refrigerant bypass conduit 26. Accordingly, the refrigerant directed into the evaporator 31 may absorb heat from the air passing through the evaporator 31, and thus the heating and dehumidification of the passenger compartment may be simultaneously performed.

(Battery Cooling System)

The battery cooling system 12 may include the battery coolant loop 22, and the battery-side coolant for cooling the battery 41 may circulate in the battery coolant loop 22.

The battery cooling system 12 may be configured to cool the battery 41 or increase a temperature of the battery 41 using the battery-side coolant circulating in the battery coolant loop 22. The battery coolant loop 22 may be fluidly connected to a battery radiator 43, a reservoir tank 48, a first battery-side pump 44, the battery chiller 37, a heater 42, the battery 41, a second battery-side pump 45, and the water-cooled heat exchanger 70. In FIG. 1, the battery-side coolant may sequentially pass through the battery radiator 43, the reservoir tank 48, the first battery-side pump 44, the battery chiller 37, the heater 42, the battery 41, the second battery-side pump 45, and the second passage 72 of the water-cooled heat exchanger 70 through the battery coolant loop 22.

The battery 41 may have a coolant passage provided inside or outside thereof, and the battery-side coolant may pass through the coolant passage. The battery coolant loop 22 may be fluidly connected to the coolant passage of the battery 41.

The heater 42 may be disposed between the battery chiller 37 and the battery 41, and the heater 42 may heat the battery-side coolant circulating in the battery coolant loop 22 to warm up the coolant. According to an exemplary embodiment, the heater 42 may be an electric heater. According to another exemplary embodiment, the heater 42 may heat the battery-side coolant by exchanging heat with a high-temperature fluid.

The battery radiator 43 may be adjacent to the front grille of the vehicle, and the battery radiator 43 may be cooled using the ambient air forcibly blown by the cooling fan 75. The battery radiator 43 may be adjacent to the exterior heat exchanger 35. According to an exemplary embodiment, the battery radiator 43 may be referred to as a low temperature radiator (LTR).

The first battery-side pump 44 may be configured to allow the battery-side coolant to circulate through at least a portion of the battery coolant loop 22, and the second battery-side pump 45 may be configured to allow the battery-side coolant to circulate through at least a portion of the battery coolant loop 22.

The reservoir tank 48 may be located between an outlet of the battery radiator 43 and an inlet of the first battery-side pump 44.

According to an exemplary embodiment, the battery coolant loop 22 may include a first coolant conduit 22a and a second coolant conduit 22b connected through a first connection conduit 22c and a second connection conduit 22d. The first coolant conduit 22a may be fluidly connected to the battery radiator 43, the reservoir tank 48, the first battery-side pump 44, and the second passage 72 of the water-cooled heat exchanger 70. The second coolant conduit 22b may be fluidly connected to the battery chiller 37, the heater 42, the battery 41, and the second battery-side pump 45.

The first connection conduit 22c may connect a downstream point of the first battery-side pump 44 and an upstream point of the second passage 37b of the battery chiller 37. Specifically, an inlet of the first connection conduit 22c may be connected to the downstream point of the first battery-side pump 44, and an outlet of the first connection conduit 22c may be connected to the upstream point of the second passage 37b of the battery chiller 37.

The second connection conduit 22d may connect a downstream point of the second battery-side pump 45 and an upstream point of the second passage 72 of the water-cooled heat exchanger 70. Specifically, an inlet of the second connection conduit 22d may be connected to the downstream point of the second battery-side pump 45, and an outlet of the second connection conduit 22d may be connected to the upstream point of the second passage 72 of the water-cooled heat exchanger 70.

The first battery-side pump 44 may be disposed at a downstream point of the battery radiator 43 in the first coolant conduit 22a of the battery coolant loop 22.

The second battery-side pump 45 may be disposed at a downstream point of the battery 41 in the second coolant conduit 22b of the battery coolant loop 22.

The first battery-side pump 44 and the second battery-side pump 45 may operate individually and selectively according to the thermal condition and charging condition of the battery 41, the operating condition of the HVAC system 11, and the like.

The battery cooling system 12 may include a three-way valve 62 mounted in at least one of the first and second connection conduits 22*c* and 22*d*.

Referring to FIG. 1, the three-way valve 62 may be disposed at the outlet of the first connection conduit 22*c*. That is, the three-way valve 62 may be disposed at a junction between the first connection conduit 22*c* and the second coolant conduit 22*b*.

When the three-way valve 62 is switched to open the outlet of the first connection conduit 22*c*, the first coolant conduit 22*a* may be fluidly connected to the second coolant conduit 22*b* through the first connection conduit 22*c* and the second connection conduit 22*d*, and accordingly the battery-side coolant may entirely circulate through the first coolant conduit 22*a* and the second coolant conduit 22*b*.

When the three-way valve 62 is switched to close the outlet of the first connection conduit 22*c*, the first coolant conduit 22*a* may be fluidly separated from the second coolant conduit 22*b*, and accordingly the battery-side coolant may circulate in the first coolant conduit 22*a* and the second coolant conduit 22*b* independently of each other. Specifically, in a state in which the three-way valve 62 is switched to close the outlet of the first connection conduit 22*c*, a portion of the battery-side coolant may independently circulate in the first coolant conduit 22*a* through the first battery-side pump 44 so that it may sequentially pass through the battery radiator 43, the reservoir tank 48, and the second passage 72 of the water-cooled heat exchanger 70, and a remaining portion of the battery-side coolant may independently circulate in the second coolant conduit 22*b* through the second battery-side pump 45 so that it may sequentially pass through the second passage 37*b* of the battery chiller 37, the heater 42, and the battery 41.

The battery cooling system 12 may be controlled by a battery management system 1100. The battery management system 1100 may monitor the state of the battery 41, and perform the cooling of the battery 41 when the temperature of the battery 41 is higher than or equal to a threshold temperature. The battery management system 1100 may transmit an instruction for the cooling of the battery 41 to the controller 1000, and accordingly the controller 1000 may control the compressor 32 to operate and control the chiller-side expansion valve 17 to open. When the operation of the HVAC system 11 is not required during the cooling operation of the battery 41, the controller 1000 may control the cooling-side expansion valve 15 to close. In addition, the battery management system 1100 may control the operation of the first battery-side pump 44, the operation of the second battery-side pump 45, and the switching of the three-way valve 62 as necessary so that the battery-side coolant may selectively flow through the first coolant conduit 22*a* and the second coolant conduit 22*b*.

(Prediction of High Load Driving)

When a driver of the vehicle inputs a destination into a navigation 1400, a vehicle controller 1300 may determine the destination of the vehicle. The vehicle controller 1300 may obtain the following estimated driving information from the navigation 1400: an estimated driving path of the vehicle; a road gradient (slope) of the estimated driving path; geographic information of the estimated driving path; and an estimated average speed and estimated driving time of the vehicle.

The vehicle controller 1300 may estimate a driving load of the vehicle based on the driving information (the estimated driving path, the road gradient and geographic information of the estimated driving path, the estimated average vehicle speed, and the estimated driving time) obtained from the navigation 1400, and determine whether the vehicle will drive in a high load condition. The high load is a vehicle load (load acting on the vehicle) higher than or equal to a threshold.

The vehicle controller 1300 may make a prediction of the vehicle's high load driving using a variety of information, that is, external environmental conditions such as an estimated ambient temperature, the estimated driving information such as the estimated driving path, the road gradient, the estimated average vehicle speed, the estimated driving time, and the like. When the vehicle travels at high speed for more than a predetermined period of time or when the vehicle is towing a trailer, it may be determined that the vehicle drives in a high load condition. For example, when the vehicle is expected to drive for about 20 minutes at an average speed of 70 kph or higher on a driving path with a road gradient of 8% based on the information of the navigation 1400, the vehicle controller 1300 may predict or determine that the vehicle will drive in a high load condition. In addition, when the vehicle is expected to drive for 30 minutes or more at an average speed of 140 kph or higher based on the information of the navigation 1400, the vehicle controller 1300 may predict or determine that the vehicle will drive in a high load condition. In addition, when the vehicle is expected to drive at an estimated ambient temperature of 50° C. or higher, the vehicle controller 1300 may predict or determine that the vehicle will drive in a high load condition.

The vehicle controller 1300 may estimate a required output of the powertrain component in real time based on the driving information obtained from the navigation 1400, and determine that the powertrain component will operate in a high load condition when the required output of the powertrain component is maintained on a continuous basis for a predetermined period of time. For example, when the electric motors 51*a* and 51*b* are expected to maintain a required torque of 80 Nm or higher for 5 minutes or more based on the driving information obtained from the navigation 1400, the vehicle controller 1300 may predict or determine that the powertrain components (the electric motors) will operate in a high load condition.

The vehicle controller 1300 may make a prediction of the vehicle's high load driving based on the information obtained from the navigation 1400, and calculate a temperature increase value of the powertrain component and an estimated temperature resulting therefrom for each time period of the estimated driving time in response to the predicted vehicle's high load driving.

(Estimated Timing of High-Load Driving)

Figure 3:
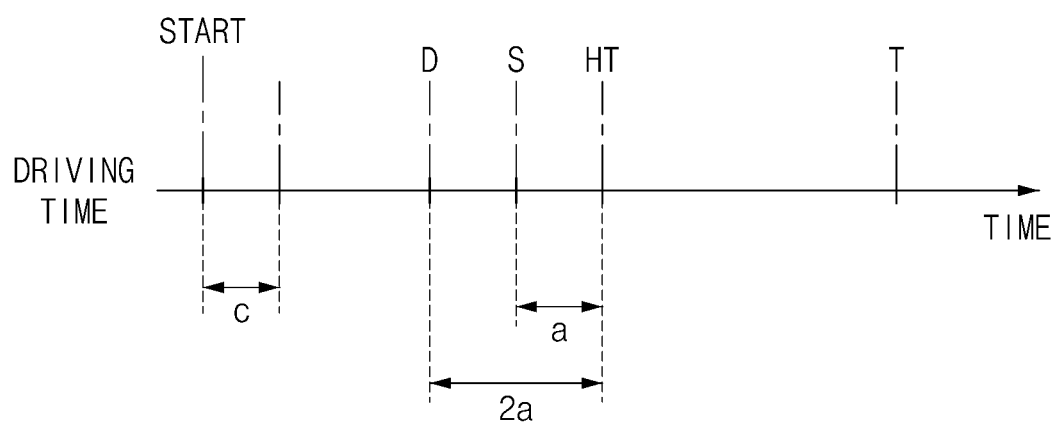
FIG. 3 illustrates estimated high-load driving timing, precooling start timing, and determination timing in a control method for cooling a powertrain component according to an exemplary embodiment of the present disclosure.

Referring to FIG. 3, the vehicle controller 1300 may predict an estimated arrival time T to the destination based on the information obtained from the navigation 1400, and determine the estimated timing of high-load driving (hereinafter referred to as the "estimated high-load driving timing HT") by comparing an estimated temperature of the powertrain component for each time period of the estimated driving time, which is calculated in real time, to a high load temperature. Specifically, the vehicle controller 1300 may determine a particular point or period of time when the estimated temperature of the powertrain component is close to the high load temperature within a predetermined error range as the estimated high-load driving timing HT. Here, the high load temperature refers to a temperature of the powertrain component at which the powertrain component operates in a high load condition. That is, the time when the estimated temperature of the powertrain component reaches the high load temperature may be determined as the estimated high-load driving timing HT. Comparing the estimated temperature of the powertrain component and the high load temperature may not be enough to accurately determine the estimated high-load driving timing HT. Specifically, in order to more accurately determine the estimated high-load driving timing HT, the estimated temperature of the powertrain component may be adjusted/corrected with a correction value on the basis of the information related to the estimated driving path and external environmental conditions obtained from the navigation 1400 and the vehicle controller 1300. When the corrected estimated temperature is compared to the high load temperature and the corrected estimated temperature is close to the high load temperature within a predetermined error range, the estimated high-load driving timing HT may be accurately determined. For example, the correction value may be calculated by considering the road gradient of the estimated driving path, surrounding geographic information (tunnels, hills, bridges, and the like), elapsed time, and external environmental conditions (ambient temperature, solar radiation, wind speed, and the like) within the estimated driving time, and the estimated temperature of the powertrain component may be multiplied by the calculated correction value, and accordingly the estimated temperature of the powertrain component may be corrected.

As the vehicle controller 1300 determines the estimated high-load driving timing HT before the estimated arrival time T, it may predict or determine precooling start timing S at which to precool the powertrain component prior to the estimated high-load driving timing HT. The precooling start timing S may be determined based on an actual temperature of the powertrain component and a cooling performance map (a map including an interior temperature of the passenger compartment and HVAC settings of the passenger compartment).

(Calculation of Estimated Temperature of Powertrain Component)

The vehicle controller 1300 may estimate a first required output of the powertrain component for each time period of the estimated driving time based on the information (the estimated driving path, the estimated driving time, the road gradient of the estimated driving path, the surrounding geographic information of the estimated driving path, the estimated average vehicle speed, and the like) obtained from the vehicle controller 1300 and the navigation 1400. The first required output of the powertrain component may be verified by a control value of the vehicle controller 1300 for controlling the operation of the powertrain component or signals such as current and voltage of the powertrain component transmitted by the vehicle controller 1300.

The vehicle controller 1300 may calculate air resistance based on the estimated average speed of the vehicle on the estimated driving path, and calculate gradient resistance (slope resistance) based on the road gradient of the estimated driving path. The vehicle controller 1300 may calculate first driving resistance of the vehicle for each time period of the estimated driving time by calculating rolling resistance, accelerating resistance, tractive resistance, and gradient resistance using a first weight of the vehicle (including the vehicle's own weight and the driver's and occupants' weights), and estimate the first required output of the powertrain component for each time period of the estimated driving time based on the calculated first driving resistance using map data and/or the like. The first driving resistance may include the rolling resistance, the air resistance, the gradient resistance, the accelerating resistance, the tractive resistance, and the like. For example, when an electric recreational vehicle (RV) with a 160 kwh motor is running at an average speed of 100 kph, the first required output of the electric motors 51a and 51b may be estimated as 22 torque, 35 Arm, 9200 rpm, and the heat generation amount of the inverters 52a and 52b may be estimated as 1446 w. In addition, when the electric RV with the 160 kwh motor is running on a road having a road gradient of 6% at an average speed of 100 kph, the first required output of the electric motors 51a and 51b may be estimated as 70 torque, 80 Arm, and 9200 rpm, and the heat generation amount of the inverters 52a and 52b may be estimated as 3689 w.

Meanwhile, the first driving resistance may be calculated based on the first weight of the vehicle. Since the first weight of the vehicle does not include the weight of a trailer being towed, the weight of luggage, and the like, the first weight of the vehicle may be significantly different from an actual weight of the vehicle when the trailer is connected to the vehicle or luggage is loaded in a trunk of the vehicle. Accordingly, accuracy in the calculations of the first driving resistance of the vehicle and the first required output of the powertrain component may be relatively lowered.

The vehicle controller 1300 may obtain actual driving information of the vehicle during an initial driving time c (see FIG. 3), and calculate an actual output of the powertrain component based on the actual driving information of the vehicle obtained during the initial driving time c. By comparing the actual output of the powertrain component to the first required output of the powertrain component, the vehicle controller 1300 may detect changes in the driving resistance of the vehicle depending on changes in the weight of the vehicle, and accordingly the vehicle controller 1300 may calculate second driving resistance of the vehicle for each time period of the estimated driving time. That is, when the weight of the vehicle changes from the first weight to the second weight, the driving resistance of the vehicle may change from the first driving resistance to the second driving resistance, and the vehicle controller 1300 may estimate a second required output of the powertrain component for each time period of the estimated driving time based on the second driving resistance using map data and/or the like. Since the second driving resistance is calculated based on the second weight, the second required output of the powertrain component may be accurately estimated in response to changes in the weight of the vehicle. The second driving resistance may include air resistance, rolling resistance, gradient resistance, accelerating resistance, tractive resistance, and the like, which are calculated based on the second weight of the vehicle. The second weight of the vehicle may include the vehicle's own weight, the driver's and occupants' weights, the weight of the luggage, and the weight of the trailer connected to the vehicle. That is, the second weight of the vehicle may be greater than the first weight of the vehicle since it includes the weight of the luggage and the weight of the trailer, and accordingly the second driving resistance with respect to the second weight of the vehicle may be greater than the first driving resistance. The initial driving time c may be a relatively short period of time (for example, about 5 minutes) after the start of the vehicle. The initial driving time c may be a time period in which the temperatures of the electric motors 51a and 51b and the temperatures of the inverters 52a and 52b remain relatively low, and the cooling of the powertrain components such as the electric motors 51a and 51b and the inverters 52a and 52b is not required during the initial driving time c.

The vehicle controller 1300 may estimate a first temperature increase value of the powertrain component for each time period of the estimated driving time based on the second required output of the powertrain component, and the vehicle controller 1300 may calculate an estimated temperature of the powertrain component for each time period of the estimated driving time based on the estimated first temperature increase value. For example, the vehicle controller 1300 may estimate nominal voltage and current of the electric motors 51*a* and 51*b* based on the second required output of the electric motors 51*a* and 51*b*, and estimate a heat generation amount of the electric motors 51*a* and 51*b* based on the estimated nominal voltage and current of the electric motors 51*a* and 51*b*. When the heat generation amount of the electric motors 51*a* and 51*b* is estimated, the powertrain controller 1200 and/or the controller 1000 may estimate an increase in coil temperature of the electric motors 51*a* and 51*b* based on HTC/GAIN obtained from rpm/torque map. With the use of this information, the powertrain controller 1200 and/or the controller 1000 may estimate a heat generation amount of the inverters 52*a* and 52*b* and a temperature of an inverter element and a temperature of a heat sink in the inverters 52*a* and 52*b* based on the state of the powertrain-side coolant. The temperature of the powertrain-side coolant passing through the coolant passage of the inverters 52*a* and 52*b* may be estimated from feedback on the ambient temperature, the temperature of the powertrain-side coolant increasing as the powertrain-side coolant circulates through the powertrain cooling system, the flow rate of the powertrain-side coolant passing through the coolant passage of the inverters 52*a* and 52*b*, and the like.

The vehicle controller 1300 may receive the external environmental conditions from the navigation 1400. In addition, the vehicle controller 1300 may monitor additional external environmental conditions itself. Here, the external environmental conditions may include the geographic information received from the navigation 1400, weather information monitored by the vehicle controller 1300, and the like. In addition, the vehicle controller 1300 may estimate the degree of influence of the external environmental conditions on the temperature of the powertrain component using the monitored and received external environmental conditions, correct the first temperature increase value of the powertrain component based on the estimated degree of influence of the external environmental conditions, and estimate a second temperature increase value of the powertrain component for each time period of the estimated driving time. The vehicle controller 1300 may calculate an estimated temperature Tp of the powertrain component for each time period of the estimated driving time based on the estimated second temperature increase value.

The geographic information may include special environmental information such as tunnels and bridges. For example, the temperature inside the tunnel is relatively low compared to the outside in summer, and is relatively high compared to the outside in winter.

The weather information may include ambient temperature, solar radiation, wind speed, and the like. The ambient temperature may be measured by an exterior temperature sensor of the vehicle. For example, when the ambient temperature is low, the temperature of the powertrain-side coolant and/or the battery-side coolant may be lowered by the radiator. The solar radiation may be measured by a solar radiation sensor of the vehicle. For example, the solar radiation information obtained by the solar radiation sensor may be divided into sunny, cloudy, snowy, and rainy. The wind speed (vehicle speed) may be calculated by a vehicle speed sensor. That is, as the speed of the vehicle is measured by the vehicle speed sensor, the wind speed in a driving direction of the vehicle may be calculated. For example, as the wind speed increases, the cooling of cases of the electric motors 51*a* and 51*b*, cases of the oil coolers 81 and 91, and cases of the inverters 52*a* and 52*b* may be improved.

The degree of influence of the external environmental conditions may be estimated using map data including correction values determined based on the geographic information and the weather information. For example, when the ambient temperature is high, the solar radiation is low, and the wind speed is high, the correction value may be set relatively low (for example, 0.8). When the ambient temperature is high, the solar radiation is normal, and the wind speed is low, the correction value may be set to an intermediate value (for example, 1.0). When the ambient temperature is high, the solar radiation is high, and the wind speed is low, the correction value may be set relatively high (for example, 1.2). By multiplying the first temperature increase value of the powertrain component by the correction value determined depending on the degree of influence of the external environmental conditions, the second temperature increase value of the powertrain component for each time period of the estimated driving time may be estimated. As the correction value determined depending on the degree of influence of the external environmental conditions increases, the second temperature increase value of the powertrain component may relatively increase. As the correction value determined depending on the degree of influence of the external environmental conditions decreases, the second temperature increase value of the powertrain component may relatively decrease. The map data may be divided into a plurality of sub-map data individually classified according to distance, time, region, and the like.

After the estimated temperature Tp of the powertrain component is calculated, the powertrain controller 1200 and/or the controller 1000 may control the operations of at least some components of the powertrain cooling system 13 so that the powertrain components may be precooled at the precooling start timing S before the estimated high-load driving timing HT of the powertrain component. Specifically, in order to precool the powertrain components, the powertrain controller 1200 and/or the controller 1000 may control the operation of the powertrain-side pump 54, the operation of the cooling fan 75, and/or the operations of the oil pumps 83 and 93. For example, the powertrain controller 1200 and/or the controller 1000 may adjust rpm of the powertrain-side pump 54 and rpm of the cooling fan 75 based on the temperatures of the inverter element and the heat sink of the inverters 52*a* and 52*b*. In addition, the powertrain controller 1200 and/or the controller 1000 may adjust rpm of the powertrain-side pump 54, rpm of the oil pumps 83 and 93, and rpm of the cooling fan 75 based on the coil temperature of the electric motors 51*a* and 51*b*, the temperature of the oil circulating through the oil circuits 80 and 90, and the like.

Figure 4A:
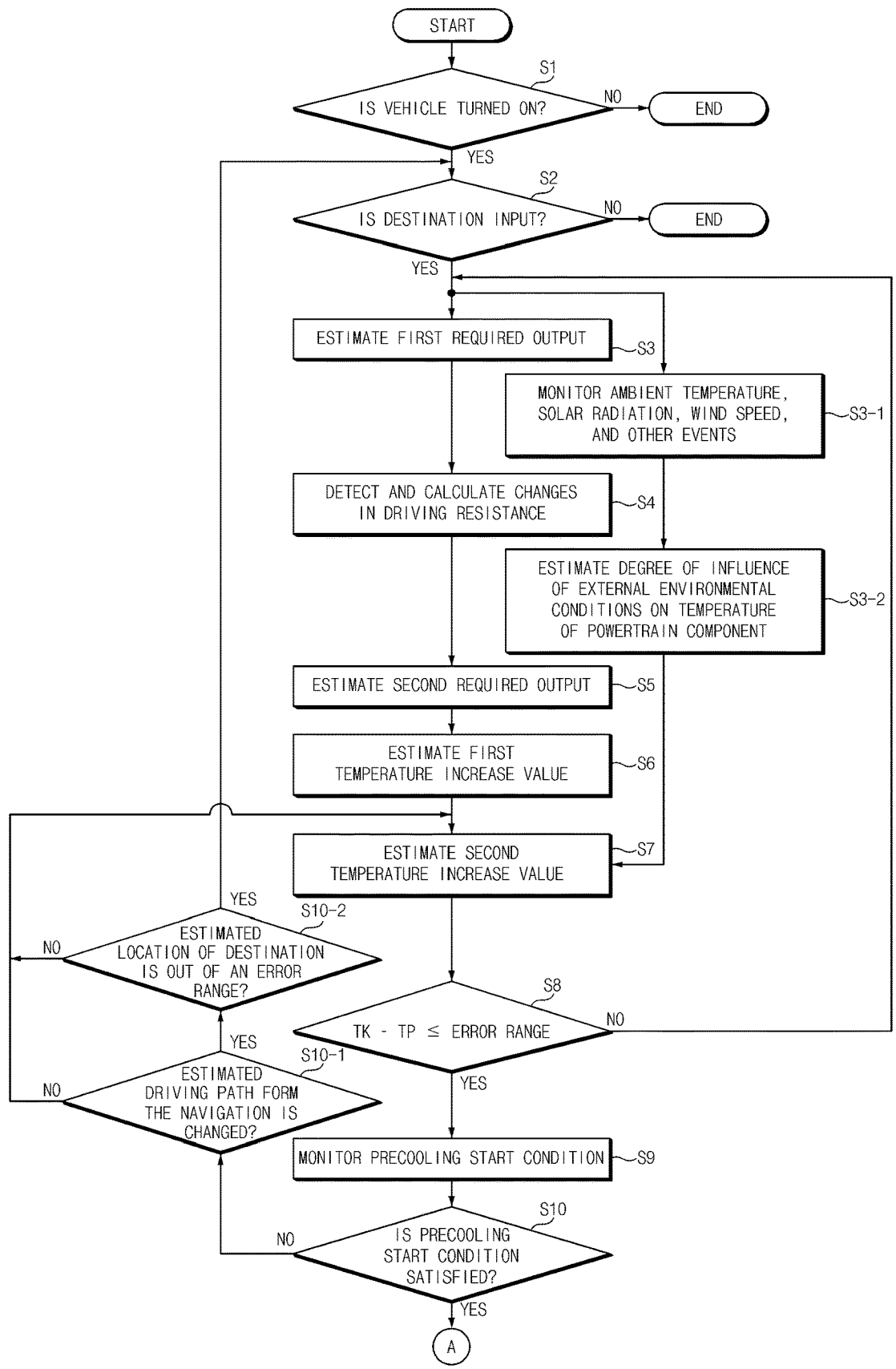
FIGS. 4A and 4B illustrate a flowchart of a control method for cooling a powertrain component according to an exemplary embodiment of the present disclosure.
Figure 4B:
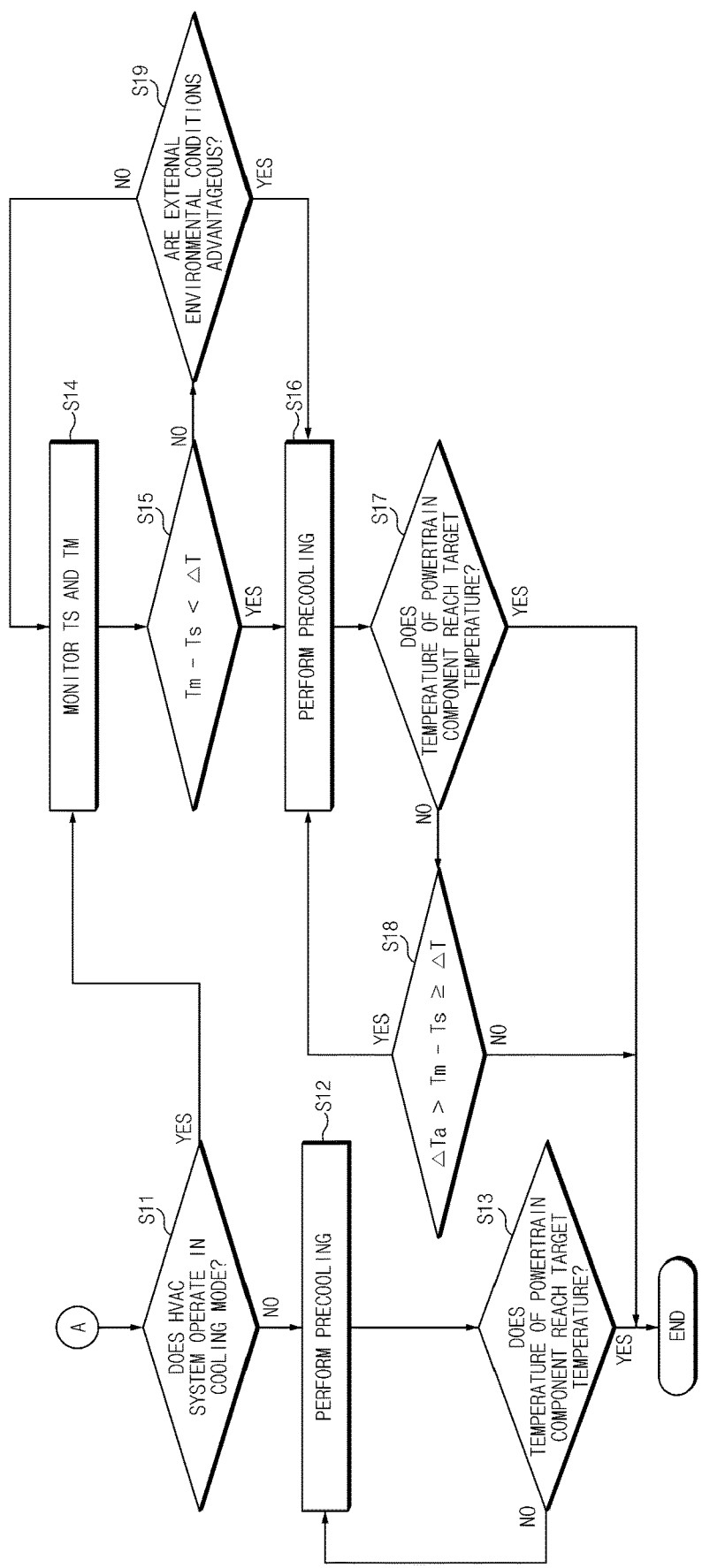

FIGS. 4A and 4B illustrate a flowchart of a control method for cooling a powertrain component according to an exemplary embodiment of the present disclosure.

It may be determined whether the vehicle is turned on (S1). When the vehicle is turned on, it may be determined whether a destination is input to the navigation 1400 (S2). As the destination is input, the vehicle controller 1300 may determine the destination, and the vehicle controller 1300 may obtain the following driving information, which is estimated/determined based on the determined destination, from the navigation 1400: an estimated driving path, an estimated driving time, a road gradient of the estimated driving path, geographic information of the estimated driving path, an estimated average vehicle speed, and the like. The vehicle controller 1300 may predict an estimated arrival time T to the destination based on the estimated driving information obtained from the navigation 1400.

The powertrain controller 1200 and/or the controller 1000 may calculate an estimated temperature of the powertrain component for each time period of the estimated driving time based on the driving information obtained from the navigation 1400, and the powertrain controller 1200 and/or the controller 1000 may determine estimated high-load driving timing HT by comparing the estimated temperature of the powertrain component for each time period to a high load temperature.

After the destination is input, the vehicle controller 1300 may calculate air resistance of the vehicle based on the estimated average speed of the vehicle on the estimated driving path, and calculate gradient resistance (slope resistance) of the vehicle based on the road gradient of the estimated driving path. The vehicle controller 1300 may calculate first driving resistance of the vehicle by calculating rolling resistance and gradient resistance using a first weight of the vehicle (including the vehicle's own weight and the driver's and occupants' weights), and estimate a first required output of the powertrain component for each time period of the estimated driving time based on the calculated first driving resistance using map data and/or the like (S3). The first required output of the powertrain component may be verified by a control value of the vehicle controller 1300 for controlling the operation of the powertrain component or signals such as current and voltage of the powertrain component transmitted by the vehicle controller 1300.

After the first required output of the powertrain component is estimated, the vehicle controller 1300 may obtain actual driving information of the vehicle during an initial driving time c (see FIG. 3), and calculate an actual output of the powertrain component based on the actual driving information of the vehicle obtained during the initial driving time c. By comparing the actual output of the powertrain component to the first required output of the powertrain component, the vehicle controller 1300 may detect changes in the driving resistance of the vehicle depending on changes in the weight of the vehicle (S4).

The vehicle controller 1300 may calculate second driving resistance of the vehicle based on the changes in the driving resistance, and estimate a second required output of the powertrain component for each time period of the estimated driving time based on the calculated second driving resistance using map data and/or the like (S5).

The vehicle controller 1300 may estimate a first temperature increase value of the powertrain component for each time period of the estimated driving time based on the second required output of the powertrain component (S6).

The vehicle controller 1300 may monitor and receive external environmental conditions such as ambient temperature, solar radiation, wind speed, and other events from the navigation 1400 (S3-1).

The vehicle controller 1300 may estimate the degree of influence of the external environmental conditions on the temperature of the powertrain component using the monitored and received external environmental conditions (S3-2).

The vehicle controller 1300 may correct the first temperature increase value of the powertrain component based on the estimated degree of influence of the external environmental conditions, and estimate a second temperature increase value of the powertrain component for each time period of the estimated driving time (S7).

The vehicle controller 1300 may calculate an estimated temperature Tp of the powertrain component for each time period of the estimated driving time based on the estimated second temperature increase value, and the vehicle controller 1300 may determine whether a temperature difference between an actual temperature Tk of the powertrain component, which is measured at determination timing D before the estimated high-load driving timing HT, and the estimated temperature Tp of the powertrain component, which is calculated at the determination timing D before the estimated high-load driving timing HT, is within an error range (S8). For example, the error range may be 1° C.-5° C.

When it is determined in S8 that the temperature difference between the actual temperature Tk of the powertrain component at the determination timing D and the estimated temperature Tp of the powertrain component at the determination timing D is out of the error range, the powertrain controller 1200 and/or the controller 1000 may determine that there is a significant error between the estimated temperature of the powertrain component and the actual temperature of the powertrain component, and accordingly the method may return to S3. By repeating those operations S3, S4, S5, S6, and S7, the vehicle controller 1300 may recalculate an estimated temperature of the powertrain component for each time period of the estimated driving time after the determination timing D.

When it is determined in S8 that the temperature difference between the actual temperature Tk of the powertrain component at the determination timing D and the estimated temperature Tp of the powertrain component at the determination timing D is within the error range, the powertrain controller 1200 and/or the controller 1000 may determine that the estimated temperature of the powertrain component is relatively accurate. Before the estimated high-load driving timing HT, the powertrain controller 1200 and/or the controller 1000 may monitor a precooling start condition of the powertrain component based on the estimated temperature of the powertrain component (S9). Specifically, the monitoring operation may be performed at a point between the determination timing D and the estimated high-load driving timing HT.

According to an exemplary embodiment, the precooling start condition refers to a condition in which a temperature difference between the actual temperature of the powertrain component and a reference temperature before the estimated high-load driving timing HT is lower than or equal to a precooling operating value (for example, any one among 1° C.-5° C.). The reference temperature refers to a temperature at which the precooling of the powertrain component is required, and the reference temperature may be determined based on the estimated driving path, the estimated driving time, the road gradient of the estimated driving path, the surrounding geographic information of the estimated driving path, the estimated average vehicle speed, and the external environmental conditions (ambient temperature, solar radiation, wind speed, special environmental information, and the like). Specifically, a reference temperature map may include reference temperatures determined based on the estimated driving path, the estimated driving time, the road gradient of the estimated driving path, the surrounding geographic information of the estimated driving path, the estimated average vehicle speed, and the external environmental conditions (ambient temperature, solar radiation, wind speed, special environmental information, and the like), and the reference temperature map may be stored in a memory of the powertrain controller 1200 and/or a memory of the controller 1000. In particular, the reference temperature for the precooling of the powertrain component according to an exemplary embodiment of the present disclosure may be lower than a reference temperature for the cooling of a powertrain component according to the related art. The precooling operating value refers to a temperature difference between the actual temperature of the powertrain component and the reference temperature. For example, the precooling operating value may be any one among 1° C.-5° C.

According to another exemplary embodiment, the precooling start condition may be a condition in which the temperature difference between the actual temperature of the powertrain component and the reference temperature before the estimated high-load driving timing HT is lower than or equal to the precooling operating value (for example, any one among 1° C.-5° C.), and an interior temperature in the passenger compartment of the vehicle is lower than or equal to an occupant's set temperature (for example, 28° C.).

According to another exemplary embodiment, when the precooling start condition is monitored, a plurality of additional precooling start conditions may be monitored. The plurality of additional precooling start conditions may include: a first additional precooling start condition in which power consumption is reduced by precooling; a second additional precooling start condition in which the external environmental conditions are advantageous to assist in the cooling of the powertrain component; and a third additional precooling start condition in which derating of the powertrain component occurs.

The first additional precooling start condition refers to the following condition: as the temperature of the powertrain component is reduced by the precooling of the powertrain component, the operating load of each component (the powertrain-side pump 54, the oil pumps 83 and 93, the cooling fan 75, and the like) of the powertrain cooling system 13, the operating load of each component (the battery-side pumps 44 and 45, the cooling fan 75, and the like) of the battery cooling system 12, and the operating load of each component (the compressor 32, the cooling fan 75, and the like) of the HVAC system 11 may be minimized. Specifically, the first additional precooling start condition refers to the following condition: power consumption of the powertrain cooling system used for cooling the powertrain component in a state in which the powertrain component is already precooled is lower than power consumption of the powertrain cooling system used for cooling the powertrain component in a state in which the powertrain component is not precooled. For example, in a state in which the temperature of the powertrain component is relatively lowered by the precooling of the powertrain component, when the temperature of the powertrain component increases to 140° C. at a certain point and is then lowered to 80° C., first power consumption for cooling the powertrain component by 60° C. may be required by the vehicle thermal management system including the powertrain cooling system 13. In a state in which the powertrain component is not precooled, when the temperature of the powertrain component increases to 160° C. at a certain point and is then lowered to 100° C., second power consumption for cooling the powertrain component by 60° C. may be required by the vehicle thermal management system including the powertrain cooling system 13. In the first additional precooling start condition, the first power consumption may be lower than the second power consumption. When the first additional precooling start condition is satisfied and the precooling operation is performed, not only the power consumption of the powertrain cooling system 13 but also the power consumption of the battery cooling system 12 and the power consumption of the HVAC system 11 may be relatively lowered, and thus the overall electric efficiency of the elective vehicle may be improved.

The second additional precooling start condition refers to the following condition: after the precooling of the powertrain component is performed, the external environmental conditions are advantageous to assist in the cooling of the powertrain component. For example, when the vehicle passes through a section with relatively low temperature such as a tunnel, the cooling of the powertrain component may be assisted by a relatively low ambient temperature.

The third additional precooling start condition refers to the following condition: after the precooling of the powertrain component is performed, the powertrain controller 1200 and/or the controller 1000 predicts or determines the derating of the powertrain component based on the estimated temperature of the powertrain component for each time period of the estimated driving time. Specifically, the third additional precooling start condition refers to the following condition: the estimated temperature of the powertrain component reaches a derating temperature at a certain point after the estimated high-load driving timing. The derating temperature refers to a temperature at which the output of the powertrain component is limited to prevent damages caused by overheating of the powertrain component. For example, when it is predicted that the estimated temperature of the electric motors 51a and 51b for each time period of the estimated driving time increases to the derating temperature (for example, 160° C.) at a certain point, the precooling of the electric motors 51a and 51b may be performed to lower the coil temperature of the electric motors 51a and 51b.

The powertrain controller 1200 and/or the controller 1000 may determine whether the aforementioned precooling start condition is satisfied (S1).

According to an exemplary embodiment, when the temperature difference between the actual temperature of the powertrain component and the reference temperature is lower than or equal to the precooling operating value (for example, any one among 1° C.-5° C.), it may be determined that the precooling start condition is satisfied.

According to another exemplary embodiment, when the temperature difference between the actual temperature of the powertrain component and the reference temperature is lower than or equal to the precooling operating value (for example, any one among 1° C.-5° C.), and the interior temperature of the passenger compartment is lower than or equal to the set temperature (for example, 28° C.), it may be determined that the precooling start condition is satisfied.

According to another exemplary embodiment, it may be determined whether the temperature difference between the actual temperature of the powertrain component and the reference temperature is lower than or equal to the precooling operating value (for example, any one among 1° C.-5° C.); the interior temperature of the passenger compartment is lower than or equal to the set temperature (for example, 28° C.); and at least one of the plurality of additional precooling start conditions is satisfied.

When the powertrain controller 1200 and/or the controller 1000 determines that the precooling start condition is satisfied in S10, the controller 1000 may determine whether the HVAC system 11 operates in a cooling mode (S11).

When the powertrain controller 1200 and/or the controller 1000 determines that the precooling start condition is not satisfied in S10, the powertrain controller 1200 and/or the controller 1000 may determine whether the estimated driving path from the navigation is changed (s10-1). When it is determined in S10-1 that the estimated driving path from the navigation is changed, the powertrain controller 1200 and/or the controller 1000 may determine whether an estimated location of the destination is out of an error range (S10-2). When it is determined in S10-1 that the estimated driving path is not changed, the method may return to S7. When it is determined in S10-2 that the estimated location of the destination is out of an error range, the method may return to S2. When it is determined in S10-2 that the estimated location of the destination is not out of an error range, the method may return to S7.

When it is determined that the HVAC system 11 does not operate in the cooling mode, the powertrain controller 1200 and/or the controller 1000 may perform the precooling of the powertrain component at the precooling start timing S (S12). Specifically, by controlling the operation of each component (the powertrain-side pump 54, the oil pumps 83 and 93, the cooling fan 75, and the like) of the powertrain cooling system 13 based on the temperature of the powertrain component at the precooling start timing S, the precooling of the powertrain component may be performed. For example, rpm of the powertrain-side pump 54 and rpm and fan duty of the cooling fan 75 may be determined based on the temperatures of the inverter element and the heat sink of the inverters 52a and 52b, and rpm of the powertrain-side pump 54, rpm and fan duty of the cooling fan 75, and rpm of the oil pumps 83 and 93 may be determined based on the coil temperature of the electric motors 51a and 51b. Accordingly, as the powertrain-side pump 54, the cooling fan 75, and the oil pumps 83 and 93 operate and the powertrain-side coolant passes through the coolant passage of each of the powertrain components 51a, 51b, 52a, 52b, and 52c, each of the powertrain components 51a, 51b, 52a, 52b, and 52c may be precooled.

Meanwhile, when it is determined in S10 that at least one of the additional precooling start conditions is satisfied, the precooling of the powertrain component may be performed according to the satisfied one of the additional precooling start conditions (S12).

After the precooling of the powertrain component is performed, it may be determined whether the actual temperature of the powertrain component reaches a target temperature (S13). The target temperature refers to a required cooling temperature at which the operation of each component (the powertrain-side pump 54, the oil pumps 83 and 93, the cooling fan 75, and the like) of the powertrain cooling system 13 may be minimized so that each component may be maintained in a low load condition, and the power limit of the powertrain component may be prevented.

When it is determined in S13 that the actual temperature of the powertrain component reaches the target temperature, the precooling of the powertrain component may end. When it is determined in S13 that the actual temperature of the powertrain component does not reach the target temperature, the method may return to S12, and the precooling of the powertrain component may be continuously performed.

When it is determined in S11 that the HVAC system 11 operates in the cooling mode, the controller 1000 may monitor a cooling set temperature Ts of the passenger compartment and an actual interior temperature Tm of the passenger compartment (S14). The cooling set temperature Ts refers to a required cooling temperature set by the occupant using an AC control unit provided on a center fascia of the vehicle, and the actual interior temperature Tm refers to an interior temperature measured in real time by a temperature sensor placed in the passenger compartment.

The controller 1000 may determine whether a temperature difference (Tm−Ts) between the actual interior temperature Tm and the cooling set temperature Ts is less than a threshold value ΔT (Tm−Ts<ΔT) (S15). The threshold value ΔT refers to a value for determining whether the precooling of the powertrain component can be carried out prior to the cooling operation of the HVAC system 11. For example, the threshold value ΔT may be 3° C.

When it is determined in S15 that the temperature difference (Tm−Ts) between the actual interior temperature Tm and the cooling set temperature Ts is less than the threshold value ΔT (Tm−Ts<ΔT), the controller 1000 may determine that the precooling of the powertrain component can be carried out prior to the cooling operation of the HVAC system 11. In the following example: the actual interior temperature Tm is 24.9° C.; the cooling set temperature Ts is 22° C.; and the temperature difference (Tm−Ts) between the actual interior temperature Tm and the cooling set temperature Ts is 2.9° C., which means that the temperature difference (Tm−Ts) between the actual interior temperature Tm and the cooling set temperature Ts is less than the threshold value ΔT of 3° C., it may be determined that the precooling of the powertrain component can be carried out prior to the cooling operation of the HVAC system 11.

When it is determined in S15 that the temperature difference (Tm−Ts) between the actual interior temperature Tm and the cooling set temperature Ts is greater than or equal to the threshold value ΔT (Tm−Ts≥ΔT), the controller 1000 may determine that the precooling of the powertrain component may not be carried out prior to the cooling operation of the HVAC system 11. In the following example: the actual interior temperature Tm is 25.1° C.; the cooling set temperature Ts is 22° C.; and the temperature difference (Tm−Ts) between the actual interior temperature Tm and the cooling set temperature Ts is 3.1° C., which means that the temperature difference (Tm−Ts) between the actual interior temperature Tm and the cooling set temperature Ts is greater than the threshold value ΔT of 3° C., it may be determined that the precooling of the powertrain component may not be carried out prior to the cooling operation of the HVAC system 11.

When it is determined in S15 that the temperature difference (Tm−Ts) between the actual interior temperature Tm and the cooling set temperature Ts is less than the threshold value ΔT, the controller 1000 may perform the precooling of the powertrain component (S16).

When it is determined in S10 that at least one of the first additional precooling start condition, the second additional precooling start condition, and the third additional precooling start condition is satisfied, and it is determined in S15 that the temperature difference (Tm−Ts) between the actual interior temperature Tm and the cooling set temperature Ts is less than the threshold value ΔT, the precooling of the powertrain component may be performed according to the satisfied one of the first additional precooling start condition, the second additional precooling start condition, and the third additional precooling start condition determined in S10.

After the precooling of the powertrain component, it may be determined whether the actual temperature of the powertrain component reaches the target temperature (S17).

When it is determined in S17 that the actual temperature of the powertrain component reaches the target temperature, the method may end.

When it is determined in S15 that the temperature difference (Tm−Ts) between the actual interior temperature Tm and the cooling set temperature Ts is greater than or equal to the threshold value ΔT (Tm−Ts≥ΔT), it may be determined whether the external environmental conditions are advantageous for the cooling of the powertrain component (S19).

When it is determined in S19 that the external environmental conditions are advantageous for the cooling of the powertrain component, the precooling of the powertrain component may be performed (S16). For example, since the temperature inside the tunnel is relatively low compared to the outside, when the vehicle passes through the tunnel, the low temperature inside the tunnel may be relatively advantageous for the cooling of the powertrain component.

When it is determined in S19 that the external environmental conditions are not advantageous for the cooling of the powertrain component, the controller 1000 may not perform the precooling of the powertrain component, and the method may return to S14. The controller 1000 may monitor the cooling set temperature Ts of the passenger compartment and the actual interior temperature Tm of the passenger compartment again.

When it is determined in S17 that the actual temperature of the powertrain component does not reach the target temperature, it may be determined whether the temperature difference (Tm−Ts) between the actual interior temperature Tm and the cooling set temperature Ts is greater than or equal to the threshold value ΔT (Tm−Ts≥ΔT) and is less than a tolerance value ΔTa (ΔTa>Tm−Ts≥ΔT) (S18). Specifically, the threshold value ΔT may be the same as that in S15, and the tolerance value ΔTa may be a value for determining whether the precooling of the powertrain component can be carried out prior to the cooling operation of the HVAC system when the actual interior temperature Tm rises slightly enough to be tolerated by the occupants. The tolerance value ΔTa may be slightly higher than the threshold value ΔT by decimal. For example, when the threshold value ΔT is 3° C., the tolerance value ΔTa may be 3.5° C.

When the temperature difference (Tm−Ts) between the actual interior temperature Tm and the cooling set temperature Ts is greater than or equal to the threshold value ΔT and is less than the tolerance value ΔTa (ΔTa>Tm−Ts≥ΔT), the controller 1000 may continuously perform the precooling of the powertrain component even if the interior temperature condition of the passenger compartment is slightly deteriorated (S16). Here, the controller 1000 may control the powertrain cooling system 13 to minimize rpm of the powertrain-side pump 54 and/or rpm of the oil pumps 83 and 93. Even in the following case: the temperature of the powertrain component does not reach the target temperature after the precooling of the powertrain component is performed; and the actual interior temperature of the passenger compartment is slightly increased by approximately 0.2° C. (the interior temperature condition of the passenger compartment is slightly deteriorated), when the precooling of the powertrain component is stopped, effectiveness of the precooling of the powertrain component may be reduced. Accordingly, when the actual interior temperature of the passenger compartment rises tolerably, the precooling of the powertrain component may be performed so that the temperature of the powertrain component may be lowered to an appropriate temperature. For example, when the actual interior temperature Tm of the passenger compartment is 24.9° C., and the cooling set temperature Ts is 22° C., the precooling of the powertrain component may be performed. Then, in a state in which the temperature of the powertrain component does not reach the target temperature, even when the actual interior temperature Tm of the passenger compartment increases to 25.1° C. by approximately 0.2° C., it may be considered a slight increase in the actual interior temperature that the occupants can tolerate. Since the temperature difference (Tm−Ts) between the actual interior temperature Tm and the cooling set temperature Ts is 3.1° C. which is less than the tolerance value ΔTa of 3.5° C., the precooling of the powertrain component may be continuously performed when the temperature of the powertrain component does not reach the target temperature. Thus, the effectiveness of the precooling of the powertrain component may be improved.

When it is determined in S18 that the temperature difference (Tm−Ts) between the actual interior temperature Tm and the cooling set temperature Ts is greater than or equal to the tolerance value ΔTa, the interior temperature condition of the passenger compartment may be excessively deteriorated, and accordingly the precooling of the powertrain component may be stopped.

According to an exemplary embodiment, the precooling start timing S may be a point in time prior to the estimated high-load driving timing HT by a first time interval a. The first time interval a may be a time interval required to cool the powertrain component to the target temperature. For example, a time interval required to lower the coil temperature of the electric motors 51a and 51b by 20° C. using the oil coolers 81 and 91 may be 10 minutes, and a time interval required to cool the inverter element of the inverters 52a and 52b by 10° C. using the coolant may be 5 minutes.

According to an exemplary embodiment, the determination timing D may be a point in time prior to the estimated high-load driving timing HT by a second time interval 2a. The second time interval 2a may be twice the first time interval a.

As set forth above, the control method for cooling a powertrain component according to exemplary embodiments of the present disclosure may be designed to make a prediction of the vehicle's high load driving based on the determination of the destination, the estimated driving information, the external environmental conditions, and the like, estimate the temperature increase of the powertrain component in response to the predicted vehicle's high load driving, and precool the powertrain component based on the estimated temperature increase before the vehicle drives in high load conditions (especially, before the estimated high-load driving timing), thereby preventing the power limit of the powertrain component, relatively reducing the power consumption of the powertrain cooling system, and improving the electric efficiency of the electric vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A control method for cooling a powertrain component, the method comprising:
in response to a destination being input to a navigation, determining estimated high-load driving timing of the powertrain component based on estimated driving information of a vehicle; and in response to a determination that a temperature difference between an actual temperature of the powertrain component and a reference temperature before the estimated high-load driving timing is lower than or equal to a precooling operating value, precooling the powertrain component until the actual temperature of the powertrain component reaches a target temperature by controlling an operation of each component of a powertrain cooling system.

2. The control method according to claim 1, further comprising:
calculating an estimated temperature of the powertrain component for each time period of an estimated driving time of the vehicle based on the estimated driving information of the vehicle, wherein in response to the determination that a temperature difference between the actual temperature of the powertrain component, which is measured at a determination timing before the estimated high-load driving timing, and the estimated temperature of the powertrain component, which is calculated at the determination timing before the estimated high-load driving timing, is within an error range, performing precooling of the powertrain component at precooling start timing based on the estimated temperature of the powertrain component.

3. The control method according to claim 2, further comprising:
in response to a determination that the temperature difference between the actual temperature of the powertrain component and the estimated temperature of the powertrain component is out of the error range, recalculating the estimated temperature of the powertrain component for each time period of the estimated driving time after the determination timing.

4. The control method according to claim 1, wherein the reference temperature is a temperature at which the precooling of the powertrain component is required, and the reference temperature is determined based on the estimated driving information and external environmental conditions.

5. The control method according to claim 1, further comprising:
determining whether a heating, ventilation, and air conditioning (HVAC) system operates in a cooling mode based on the determination that the temperature difference between the actual temperature of the powertrain component and the reference temperature before the estimated high-load driving timing is lower than or equal to the precooling operating value.

6. The control method according to claim 5, further comprising:
in response to determining the HVAC system does not operate in the cooling mode, performing precooling of the powertrain component.

7. The control method according to claim 5, further comprising:
in response to determining the HVAC system operates in the cooling mode and a temperature difference between an actual interior temperature of a passenger compartment and a cooling set temperature of the passenger compartment is less than a threshold value, performing precooling of the powertrain component.

8. The control method according to claim 7, further comprising:
in response to determining the actual temperature of the powertrain component does not reach the target temperature after the precooling of the powertrain component, and the temperature difference between the actual interior temperature of the passenger compartment and the cooling set temperature of the passenger compartment is greater than or equal to the threshold value and is less than a tolerance value, continuously performing precooling of the powertrain component.

9. The control method according to claim 5, further comprising:
in response to determining the HVAC system operates in the cooling mode and a temperature difference between an actual interior temperature of a passenger compartment and a cooling set temperature of the passenger compartment is greater than or equal to a threshold value, determining whether external environmental conditions are advantageous for the cooling of the powertrain component.

10. The control method according to claim 9, further comprising:
in response to determining the external environmental conditions are advantageous for the cooling of the powertrain component, performing precooling of the powertrain component.

11. The control method according to claim 1, further comprising:
calculating first driving resistance of the vehicle based on the estimated driving information, and estimating a first required output of the powertrain component for each time period of estimated driving time of the vehicle based on the calculated first driving resistance; and
calculating second driving resistance of the vehicle based on the first required output of the powertrain component and an actual output of the powertrain component obtained during an initial driving time, and estimating a second required output of the powertrain component for each time period of the estimated driving time based on the calculated second driving resistance.

12. The control method according to claim 11, further comprising:
estimating a first temperature increase value of the powertrain component for each time period of the estimated driving time of the vehicle based on the second required output;
estimating a degree of influence of external environmental conditions on the actual temperature of the powertrain component using the external environmental conditions received from the navigation and a vehicle controller;
estimating a second temperature increase value of the powertrain component by correcting the first temperature increase value of the powertrain component based on the estimated degree of influence of the external environmental conditions; and
calculating an estimated temperature of the powertrain component for each time period of the estimated driving time based on the second temperature increase value.

13. The control method according to claim 2, further comprising:
in response to determining whether the temperature difference between the actual temperature of the powertrain component and the estimated temperature of the powertrain component is within the error range, determining whether at least one of additional precooling start conditions is satisfied, wherein the additional precooling start conditions include:
a first additional precooling start condition in which power consumption is reduced by precooling;

a second additional precooling start condition in which external environmental conditions are advantageous to assist in the cooling of the powertrain component; and a third additional precooling start condition in which derating of the powertrain component occurs; and in response to at least one of the first additional precooling start condition, the second additional precooling start condition, and the third additional precooling start condition being satisfied, performing precooling of the powertrain component according to the satisfied one of the additional precooling start conditions.

14. The control method according to claim 2, wherein the precooling start timing is a point in time prior to the estimated high-load driving timing by a first time interval, and the first time interval is a time interval required to cool the powertrain component to the target temperature.

15. The control method according to claim 14, wherein the determination timing is a point in time prior to the estimated high-load driving timing by a second time interval, and the second time interval is twice the first time interval.

16. A method for cooling a powertrain component of a vehicle, the method comprising:

in response to a destination being input to a navigation of the vehicle, determining estimated high-load driving timing of the powertrain component;

calculating an estimated temperature of the powertrain component for each time period of estimated driving time of the vehicle, wherein the determination that a temperature difference between an actual temperature of the powertrain component and a reference temperature before the estimated high-load driving timing is lower than or equal to a precooling operating value is measured at a determination timing before the estimated high-load driving timing, and the estimated temperature of the powertrain component, which is calculated at the determination timing before the estimated high-load driving timing, is within an error range; and in response to the determination that the temperature difference between the actual temperature of the powertrain component and the reference temperature before the estimated high-load driving timing is lower than or equal to the precooling operating value, precooling the powertrain component.

17. The method according to claim 16, wherein the reference temperature is a temperature at which the precooling of the powertrain component is required, and the reference temperature is determined based on estimated driving information and external environmental conditions.

* * * * *